United States Patent [19]

Niwa et al.

[11] Patent Number: 4,623,719

[45] Date of Patent: Nov. 18, 1986

[54] DISAZO DYESTUFFS HAVING A MONOFLUOROTRIAZINYL GROUP

[75] Inventors: Toshio Niwa; Kiyoshi Himeno; Toshio Hihara, all of Yokohama, Japan

[73] Assignee: Mitsubishi Chemical Industries Limited, Tokyo, Japan

[21] Appl. No.: 843,927

[22] Filed: Mar. 24, 1986

Related U.S. Application Data

[63] Continuation of Ser. No. 566,732, Dec. 29, 1983, abandoned.

[30] Foreign Application Priority Data

Jan. 18, 1983 [JP] Japan ................................ 58-6031

[51] Int. Cl.$^4$ ........................................... C07C 107/06
[52] U.S. Cl. ..................................... 534/636; 534/764
[58] Field of Search ........................................ 534/636

[56] References Cited

U.S. PATENT DOCUMENTS 3,974,160 8/1976 Seiler et al. ........................... 260/249

FOREIGN PATENT DOCUMENTS 0019728 12/1980 European Pat. Off. ............. 534/636

Primary Examiner—Charles F. Warren
Assistant Examiner—Carolyn S. Greason
Attorney, Agent, or Firm—Oblon, Fisher, Spivak, McClelland, & Maier

[57] ABSTRACT

This invention relates to disazo dyestuffs for cellulose or cellulose-containing fibers represented by the formula:

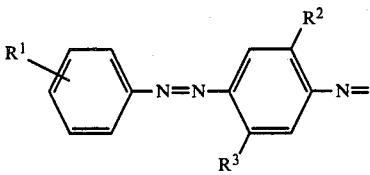

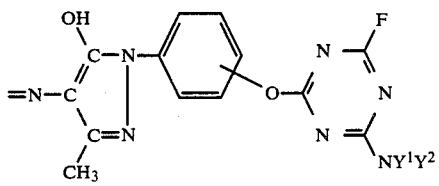

wherein $R^1$ represents a hydrogen atom, a nitro group, a halogen atom, an alkyl group of 1 or 2 carbon atoms or an acetylamino group; $R^2$ and $R^3$ each represents a hydrogen atom, an alkyl group of 1 or 2 carbon atoms, and alkoxy group or an acetylamino group; $Y^1$ and $Y^2$ each represents a hydrogen atom or an alkyl group, and alkenyl group, a cyclohexyl group, an aryl group or an aralkyl group which group ma optionally be substituted by cyano, hydroxyl, lower alkoxy or dialkylamino, or $NY^1Y^2$ represents a 5-membered or 6-membered nitrogen-containing heretocyclic ring formed by combination of $Y^1$ and $Y^2$, and the total carbon atoms in $Y^1$ and $Y^2$ is 18 or less.

3 Claims, No Drawings

DISAZO DYESTUFFS HAVING A MONOFLUOROTRIAZINYL GROUP

This application is a continuation of application Ser. No. 566,732, filed Dec. 29, 1983, now abandoned.

BACKGROUND OF THE INVENTION

1. Field of the Invention

This invention relates to disazo dyestuffs having a monofluorotriazinyl group for cellulose-containing fibers. More specifically, it relates to disazo dyestuffs having a trifluorotriazinyl group which dye cellulose fibers, polyester fibers or mixed fibers consisting of polyester fibers and cellulose fibers in an orange color having excellent various fastness properties, particularly light fastness.

2. Description of Prior Art

The following two dyestuffs which contain a monofluorotriazinyl group and dye cellulose fiber/polyester mixed fabrics in yellow to orange colors are known (Japanese Patent Application Laid-open No. 151064/1980):

The above-described object may be achieved by employing disazo dyestuffs for cellulose or cellulose-containing fibers of the formula:

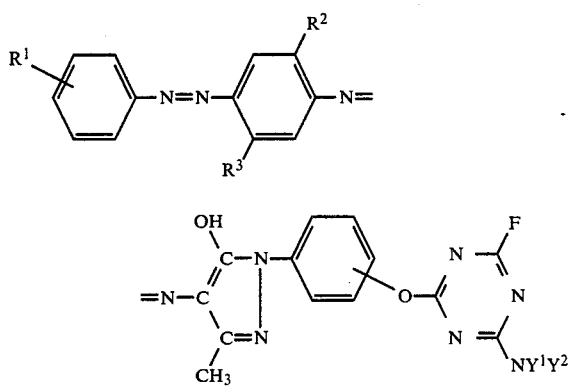

wherein $R^1$ represents a hydrogen atom, a nitro group, a halogen atom, an alkyl group of 1 or 2 carbon atoms or an acetylamino group; $R^2$ and $R^3$ each represents a

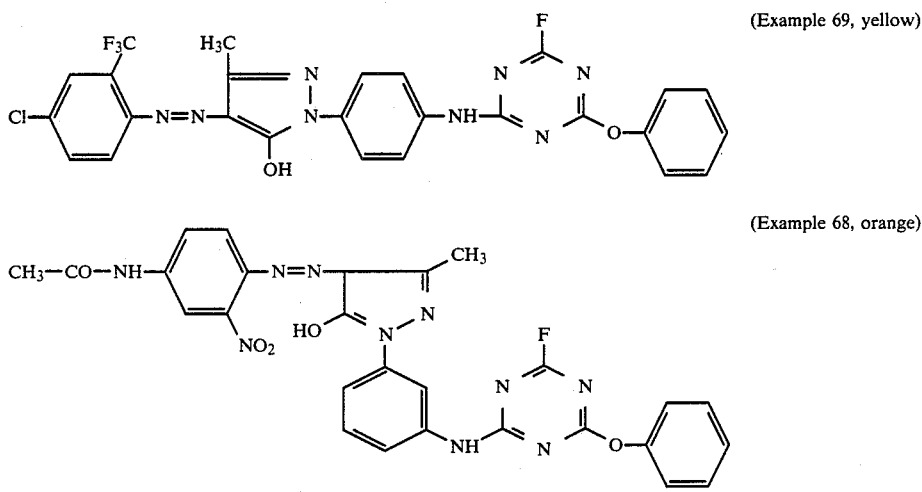

(Example 69, yellow)

(Example 68, orange)

SUMMARY OF THE INVENTION

The object of this invention is to provide disazo dyestuffs having a monofluorotriazinyl group which dye natural fibers such as cotton, linen etc., semisynthetic fibers such as viscose rayon, copper ammonia rayon etc., modified cellulose fibers which are partially aminated or partially acylated, polyester fibers, cation-dyeable polyester fibers, anion-dyeable polyester fibers, polyamide fibers, wool, acryl fibers, urethane fibers, diacetate fibers, triacetate fibers, etc., or woven or knitted fabrics, non-woven fabrics, mixed yarns or mixed woven fabrics of these various fibers, in particular, cellulose fibers, polyester fibers or mixed yarns or mixed woven fabrics of cellulose fibers and polyester fibers, in an orange color having excellent light fastness.

hydrogen atom, an alkyl group of 1 or 2 carbon atoms, an alkoxy group or an acetylamino group; $Y^1$ and $Y^2$ each represents a hydrogen atom or an alkyl group, an alkenyl group, a cyclohexyl group, an aryl group or an aralkyl group which group may optionally be substituted by cyano, hydroxyl, lower alkoxy or dialkylamino, or $NY^1Y^2$ represents a 5-membered or 6-membered nitrogen-containing heterocyclic ring formed by combination of $Y^1$ and $Y^2$, and the total carbon atoms in $Y^1$ and $Y^2$ is 18 or less.

DETAILED DESCRIPTION OF THE PREFERRED EMBODIMENTS

The dyestuffs according to this invention are disazo dyestuffs for cellulose-containing fibers of the formula [I]:

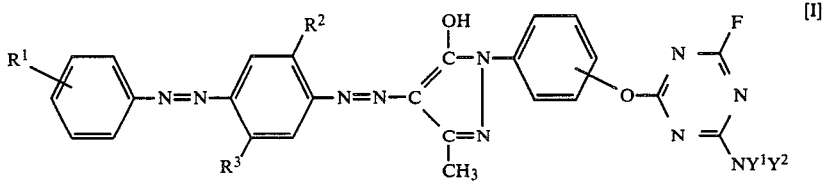

wherein R¹ represents a hydrogen atom, a nitro group, a halogen atom, an alkyl group of 1 or 2 carbon atoms or an acetylamino group; R² and R³ each represents a hydrogen atom, an alkyl group of 1 or 2 carbon atoms, an alkoxy group or an acetylamino group; $Y^1$ and $Y^2$ each represents a hydrogen atom or an alkyl group, an alkenyl group, a cyclohexyl group, an aryl group or an aralkyl group which group may optionally be substituted by cyano, hydroxyl, lower alkoxy or dialkylamino, or $NY^1Y^2$ represents a 5-membered or 6-membered nitrogen-containing heterocyclic ring formed by combination of $Y^1$ and $Y^2$, and the total carbon atoms in $Y^1$ and $Y^2$ is 18 or less.

The dyestuffs of the formula [I] above may be easily produced by reacting a disazo type compound of the formula [II]:

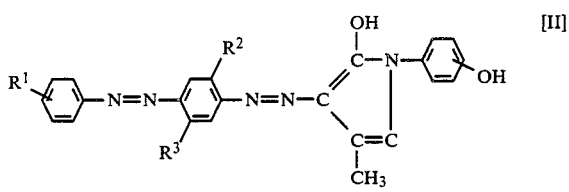

wherein R¹, R² and R³ are as defined above with, for example, a compound of the formula [III]:

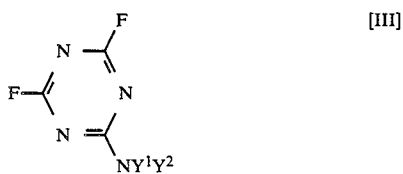

wherein $Y^1$ and $Y^2$ are as defined above.

This invention is described in detail below.

Examples of the halogen atom represented by R¹ in the formula [I] and [II] include fluorine, chlorine and bromine.

Examples of the alkyl group represented by $Y^1$ and $Y^2$ in the formula [III] include methyl, ethyl and straight-chain or branched-chain alkyl of 3–18 carbon atoms, and examples of the substituted alkyl include alkyl substituted by cyano, hydroxyl, lower alkoxy or dialkylamino, such as cyanomethyl, 2-cyanoethyl, 3-cyanopropyl, 2-hydroxyethyl, 2-hydroxypropyl, 3-hydroxypropyl, 4-hydroxybutyl, 2-(2-hydroxyethoxy)ethyl, tris(hydroxymethyl)methyl, 2-ethoxyethyl, 3-isopropoxypropyl, 3-(2-methoxyethoxy)propyl, 2,2-diethoxyethyl, 2-(N,N-diethylamino)ethyl, 2-(N,N-dimethylamino)ethyl, 3-(N,N-dimethylamino)propyl, etc.

Examples of the alkenyl include allyl, 2-methylallyl, 3-methylallyl and straight-chain or branched-chain alkenyl of 4–18 carbon atoms, and examples of the substituted alkenyl include alkenyl substituted by cyano, hydroxyl or lower alkoxy, such as 3-cyanoallyl, 2-hydroxyallyl, 3-methoxyethoxyallyl, 1-methyl-3-(N,N-diethylamino)allyl, etc.

Examples of the aryl include phenyl, naphthyl, o-tolyl, p-butylphenyl etc., and examples of the aryl substituted by cyano, hydroxyl, lower alkoxy or dialkylamino include m-cyanophenyl, p-hydroxyphenyl, p-methoxyphenyl, p-(2-methoxyethoxy)phenyl, 2,5-dimethoxyphenyl, p-(N,N-dimethylamino)phenyl, etc.

Examples of the aralkyl include benzyl, phenethyl, m-methylbenzyl, p-methylphenethyl etc., and examples of the substituted aralkyl include m-cyanobenzyl, p-hydroxybenzyl, p-hydroxyphenethyl, o-anisyl etc.

Examples of the nitrogen-containing heterocyclic group represented by $NY^1Y^2$ include 1-pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperadinyl, 4-methyl-1-piperadinyl etc.

The di-substituted amino groups of the total carbon atom number of 6–12 are particularly preferred as $NY^1Y^2$.

For producing the disazo dyestuffs of the formula [I], a disazo type compound of the formula [II] and 1–1.2 molar times based on said disazo type compound of a difluorotriazine of the formula [III] may be heated together in an organic solvent, for example, acetone, methyl ethyl ketone, toluene, nitrobenzene, dioxane, N,N-dimethylformamide, N-methyl-2-pyrrolidone, dimethylsulfoxide etc. in the presence of 1–2 molar times based on the aforesaid disazo type compound of an acid binding agent, for example, a tertiary amine such as triethylamine, tributylamine, N,N-diethylaniline etc. or an inorganic base such as potassium carbonate, potassium bicarbonate etc. at 40°–90° C. for 0.5–5 hours. The resulting reaction mixture is cooled, then, for example, poured into water, and the thus formed precipitates as separated by e.g. filtration, centrifugal separation etc., thereby the disazo dyestuff of the formula [I] may be obtained almost quantitatively.

Examples of the fibers which are dyed with the dyestuffs of the formula [I] according to this invention include natural fibers such as cotton, linen etc.; semisynthetic fibers such as viscose rayon, copper ammonia rayon etc.; modified cellulose fibers which are partially aminated or partially acylated, polyester fibers, cation-dyeable polyester fibers, anion-dyeable polyester fibers, polyamide fibers, wool, acryl fibers, urethane fibers, diacetate fibers, triacetate fibers, etc.; or woven or knitted fabrics, non-woven fabrics, mixed yarns or mixed woven fabrics of these various fibers, in particular, cellulose fibers, polyester fibers or mixed yarns or mixed woven fabrics of cellulose fibers and polyester fibers may be effectively dyed.

On carrying out dyeing, the dyestuffs of the formula [I] above are desirably finely dispersed in a medium in a particle size of about 0.5–2μ, and examples of the method of attaining this purpose include a method which comprises finely dispersing the dyestuff in water with a water-soluble dispersing agent, for example, a nonionic dispersing agent such as a pluronic type surface active agent, or an anionic dispersing agent such a sodium ligninsulfonate or a sodium salt of naphthalene-sulfonic acid-formaldehyde condensate, etc. employing a grinder such as a sand grinder, a mill etc.; a method which comprises finely dispersing the dyestuff in a solvent other than water, for example, alcohols such as ethyl alcohol, isopropyl alcohol, polyethylene glycol etc., ketones such as acetone, methyl ethyl ketone etc., hydrocarbons such as n-hexane, toluene, xylene, mineral terpene etc., halogenated hydrocarbons such as tetrachloroethylene etc., esters such as ethyl acetate, butyl acetate etc., ethers such as dioxane, tetraethylene glycol dimethyl ether etc., or mixtures thereof, employing a dispersing agent sparingly soluble or insoluble in water, for example, sulfosuccinic acid esters, addition products of nonylphenol etc. with low moles of ethylene oxide, etc.; a method which comprises finely dispersing the dyestuff in a mixed system of water and a solvent freely compatible with water selected from the above-described solvents, and so forth.

In addition, during the course of dispersing described above, polymer compounds soluble in the respective dispersing media or surface active agents having other than dispersing action may also be added.

While the fine dispersion of the dyestuff can be used as such either as a padding bath in pad dyeing or as a printing paste in print dyeing, it is general to employ as a padding bath or as a printing paste that obtained by further diluting the above-described dispersion of the dyestuff to a proportion according to the desired dyeing concentration with water, or a mixed system of a solvent freely compatible with water and water, or an O/W or W/O emulsion in which the oily layer is a petroleum hydrocarbon such as mineral terpene etc. or a halogenated hydrocarbon such as tetrachloroethylene etc.

In order to advantageously carry out dyeing in the preparation of the padding bath or the printing paste, alkali metal compounds, organic epoxy compounds, organic vinyl compounds etc. may also be added as acid binding agents for the purpose of accelerating the reaction of cellulose fiber-swelling agents or the dyestuffs with cellulose fibers. Not only alkali metal carbonates, but also alkali metal bicarbonates, alkali metal phosphates, alkali metal borates, alkali metal silicates, alkali metal hydroxides, alkali metal fatty acid salts such as alkali metal acetates etc. and alkali precursor compounds such as sodium trichloroacetate, sodium acetoacetate etc. which generate an alkali when heated in the presence of water can be employed as alkali metal compounds. The amount of those alkali metal compounds used is, in general, satisfactorily such that the pH of the padding bath or the printing paste is 7.5–8.5. Examples of the organic epoxy compounds include ethylene glycol diglycidyl ether, polyethylene glycol diglycidyl ether having an average molecular weight of 150–400 etc., and examples of the organic vinyl compounds include ethylene glycol diacrylate, diacrylate or dimethacrylate of polyethylene glycol having an average molecular weight of 150–400 etc. The amount of those used is approximately 3–6% by weight based on the padding bath or the printing paste.

For the purpose of preventing dry migration in padding dyeing or for the purpose of controlling the color paste to an optimum viscosity for various printing dyeing methods, thickeners, for example, water-soluble polymers such as sodium alginate etc. may also be added.

The preparation of the padding bath or the printing paste is not limited to the methods described above, and further, it is not always necessary that the cellulose fiber-swelling agent and the acid binding agent be present in the padding bath or the printing color paste and may also be previously present in the fibers. Any compounds can be used as the cellulose fiber-swelling agents so long as those have a boiling point of 150° C. or above and have an effect to swell cellulose fibers, and examples thereof include ureas such as N,N,N',N'-tetramethylurea etc., polyhydric alcohols such as polyethylene glycol, polypropylene glycol etc. or derivatives thereof. Inter alia, polyhydric alcohol derivatives of polyethylene glycol, polypropylene glycol etc. having an average molecular weight of about 200–500 wherein the hydroxyl groups at both terminals are dimethylated or diacetylated and do not react with the reactive groups of the dyestuffs are preferred as the cellulose fiber-swelling agents.

The amount of the cellulose fiber-swelling agent used is suitably about 5–25% by weight, preferably about 8–15% by weight, based on the padding bath or the printing color paste.

Dyeing of the above-described fibers with the dyestuffs of the formula [I] may be achieved by the conventional manner, for example, by impregnating or printing the thus prepared padding bath or printing color paste with or to cellulose fiber-containing materials, drying them, then heat-treating with hot air at 160°–220° C. or with superheated steam for 30 seconds to 10 minutes, alternatively, treating in a high pressure saturated steam at 120°–150° C. for 3–30 minutes, and washing with hot water containing a surface active agent, or washing with a washing bath of an O/W or W/O emulsion in which the oil layer is a halogenated hydrocarbon such as tetrachloroethylene etc., or washing by the conventional dry cleaning technique.

By the process described above, dyed materials which have been clearly and uniformly dyed and have excellent light fastness and wet color fastness may be obtained.

This invention is now described in more detail by reference to the examples, but it should be noted that this invention is not limited thereto.

EXAMPLE 1

A dyestuff dispersion was preapred from a dyestuff composition consisting of 15 g of a disazo dyestuff of the structural formula:

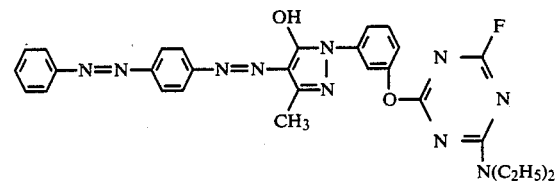

15 g of a naphthalenesulfonic acid-formaldehyde condensate and 70 ml of water by finely dispersing using a paint shaker. Using this dyestuff dispersion, a printing color paste (pH 8.0) having the following composition:

| Dye dispersion | 6.5 g |
| --- | --- |
| 5% Sodium alginate aqueous solution | 55 g |
| Polyethylene glycol dimethyl ether, average molecular weight: 400 | 9 g |
| Water | balance |
| Total | 100 g | was prepared. A polyester/cotton (mixing ratio: 65/35) mixed spun cloth was print dyed with the printing color paste using a screen print dyeing machine, and, after provisionally drying at 80° C. for 3 minutes, dry heated at 215° C. for 90 seconds to fix the paste. After washing with water, the cloth was soaped with a detergent containing 2 g/l of a nonionic surface active agent ("Scoural #900", trademark, manufactured by Kao Soap Co., Ltd.) in a bath ratio of 1:30 at 80° C. for 20 minutes to obtain an orange dyed product having excellent light fastness and wet color fastness.

The dyestuff used in this example was prepared by the procedures described below. 3.97 g of a dye having the following structure:

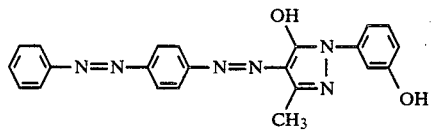

2.1 g of 2,4-difluoro-6-(diethyl)aminotriazine, 1.0 g of triethylamine and 1.0 g of potassium carbonate anhydride were added to 100 ml of acetone, then heated at reflux for 3 hours to effect a condensation reaction. The reaction mixture thus obtained was poured dropwise to 1,000 ml of water, the formed precipitates were washed with water, and dried at room temperature to obtain 5.2 g (yield 92%) of a yellow powder of the dyestuff of this example.

The maximum absorption wavelength λmax (acetone) of this dyestuff was 414 nm.

EXAMPLE 2

A dyestuff dispersion was prepared from a dyestuff composition consisting of 15 g of a disazo dyestuff of the structural formula:

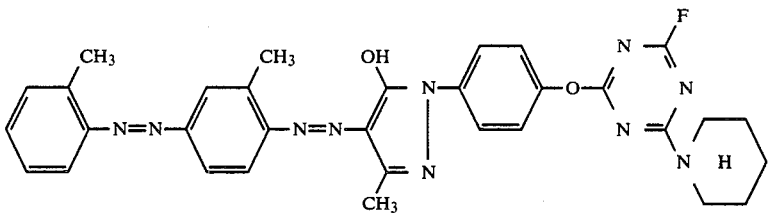

10 g of a Pluronic type surface active agent, "Pluronic L 64" (trademark manufactured by Asahi Electrochemical Industries, Ltd.) and 75 ml of water by finely dispersing using a sand grinder. A printing color paste (pH 6.5) having the following composition:

| Dyestuff dispersion | 7 g |
| --- | --- |
| 5% Sodium alginate aqueous solution | 55 g |
| Diacetate of polypropylene glycol, average molecular weight: 300 | 10 g |
| Polyethylene glycol diglycidyl ether, average molecular weight: 200 | 3 g |
| Water | balance |
| Total | 100 g | was prepared. A mercerized cotton broad (40 counts) was print dyed with this color paste using a screen print dyeing machine, then provisionally dried at 70° C. for 3 minutes, and treated with superheated steam at 185° C. for 7 minutes. Thereafter, the cloth was washed in a similar manner to that in Example 1 to obtain an orange dyed product having excellent light fastness and wet color fastness.

The dyestuff used in this example was obtained by reacting a dye having the following structure:

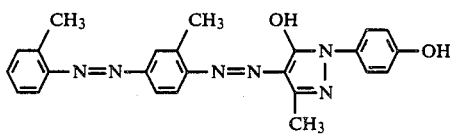

with 2,4-difluoro-6-piperidinotriazine in N-methyl-2-pyrrolidone using triethylamine as an acid binding agent.

The λmax (acetone) of this product was 416 nm.

EXAMPLE 3

A dyestuff ink was prepared from a disazo dyestuff composition consisting of 10 g of a dyestuff of the structural formula:

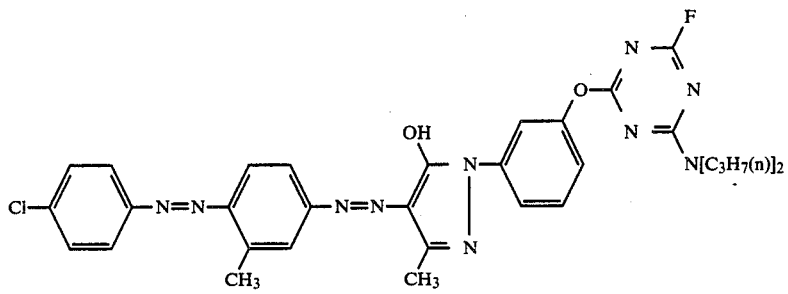

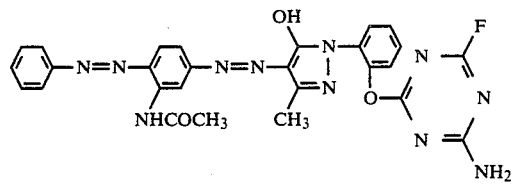

2 g of polyoxyethylene glycol nonylphenyl ether (HLB 8.9) and 88 g of diethylene glycol diacetate by pulverizing using a paint conditioner as a finely dispersing machine.

10 g of this dyestuff ink and 55 g of mineral terpene were mixed, and this was gradually added to 35 g of an aqueous solution having the following composition while stirring by a homomixer (5,000–7,000 rpm) until the system become homogeneous, to obtain a viscous O/W emulsion color paste.

| | |
|---|---|
| Lepitol G (trademark, manufactured by Daiichi Kogyo Seiyaku Co., Ltd., special nonionic surface active agent) | 3.8 g |
| Sodium trichloroacetate | 0.1 g |
| Water | balance |
| Total | 34.9 g |

Then, a polyester/cotton (mixing ratio: 65/35) mixed spun cloth was print dyed with this color paste using a screen print dyeing machine, and, after drying at 100° C. for 2 minutes, treated with superheated steam at 175° C. for 7 minutes. Thereafter, the cloth was washed in a hot tetrachloroethylene bath containing a small amount of water and dried to obtain an orange dyed product having excellent light fastness and wet color fastness with no stain on white ground.

The dyestuff used in this example was obtained by reacting a dye having the following structure:

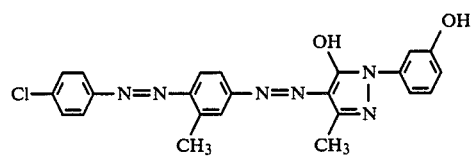

with 2,4-difluoro-6-(di-isopropylamino)triazine according to Example 1.

The λmax (acetone) of this product was 420 nm.

EXAMPLE 4

A dyestuff dispersion was prepared from a dyestuff composition consisting of 16 g of a disazo dyestuff of the structural formula:

7 g of polyoxyethylene glycol nonylphenyl ether (HLB 13.3), 3 g of naphthalenesulfonic acid-formaldehyde condensate and 74 ml of water by finely dispersing using a sand grinder. Using this dyestuff dispersion, a padding bath (pH 8.0) having the following composition:

| | |
|---|---|
| Dyestuff dispersion | 6 g |
| Tetraethylene glycol dimethyl ether | 15 g |
| Water | balance |
| Total | 100 g | was prepared. A polyester/cotton (mixing ratio: 65/35) mixed spun cloth was impregnated therewith, squeezed to a squeezing rate of 45%, then dried at 100° C. for 2 minutes, and dry heated at 200° C. for 1 minute to fix. The cloth was washed in a hot ethanol bath to obtain an orange dyed product having excellent light fastness and wet color fastness.

The dyestuff used in this example was synthesized according to the procedures described in Example 1.

The λmax (acetone) of ths product was 419 nm.

EXAMPLE 5

Print dyeing was conducted in the same manner as in Example 1 except that the fiber was changed to a nylon/rayon (mixing ratio: 50/50) mixed spun cloth and further the dry heating temperature for fixing was changed to 185° C., to obtain a reddish yellow dyed product having excellent wet color fastness and light fastness.

EXAMPLE 6

Print dyeing was conducted using the disazo dyestuffs set forth in Tables 1-3 according to the procedures described in Example 1.

Both light fastness and wet color fastness of each obtained dyed product were excellent.

The hue of each dyed cloth and the λmax (acetone) of each dyestuff are set forth in Tables 1-3.

TABLE 1

General Formula

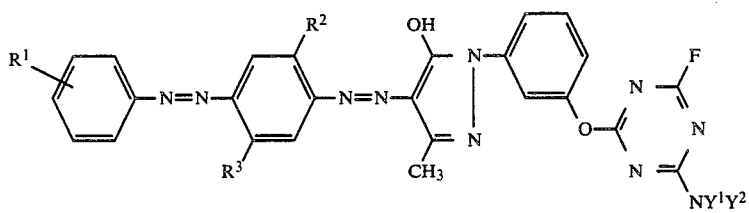

| No. | R¹-〈phenyl〉 | —R² | —R³ | —NY¹Y² | Hue of Dyed Product | $\lambda_{max}$ (acetone) nm |
|---|---|---|---|---|---|---|
| 1 | phenyl | —H | —H | —N[C₃H₇(i)]₂ | Orange | 414 |
| 2 | " | " | " | —N(C₂H₅)(C₃H₆OH) | " | " |
| 3 | " | " | " | —N(C₂H₄OCH₃)₂ | " | " |
| 4 | " | " | " | —N(C₂H₄CN)₂ | " | " |
| 5 | " | " | —CH₃ | —N(piperazine)N—C₂H₄OH | " | 415 |
| 6 | CH₃—〈phenyl〉 | " | —OCH₃ | —N(morpholine)O | " | 421 |
| 7 | Cl—〈phenyl〉 | —OCH₃ | —CH₃ | —NH—〈phenyl〉 | " | 424 |
| 8 | F—〈phenyl〉 | —H | —H | —NH(CH₂)₈CH=CH(CH₂)₇CH₃ | " | 418 |
| 9 | O₂N—〈phenyl〉 | —H | —H | —N[C₉H₁₀(n)]₂ | " | 428 |
| 10 | CH₃C(O)NH—〈phenyl〉 | —C₂H₅ | —C₂H₅ | —NHC₅H₁₁(i) | " | 423 |

TABLE 1-continued

General Formula $$R^1-\text{C}_6\text{H}_3(R^2)(R^3)-N=N-\text{C}(OH)=\text{C}(CH_3)-N=N-\text{C}_6\text{H}_4-O-\text{C}(=N-\text{C}(F)=N-)N-NY^1Y^2$$

| No. | $R^1$-phenyl- | $-R^2$ | $-R^3$ | $-NY^1Y^2$ | Hue of Dyed Product | $\lambda_{max}$ (acetone) nm |
|---|---|---|---|---|---|---|
| 11 | 2-C₂H₅-phenyl | —H | —NHCOCH₃ | —N[C₄H₉(sec)]₂ | " | 420 |

TABLE 2

General Formula (para-substituted phenoxy variant of the above triazine)

| No. | $R^1$-phenyl- | $-R^2$ | $-R^3$ | $-NY^1Y^2$ | Hue of Dyed Product | $\lambda_{max}$ (acetone) nm |
|---|---|---|---|---|---|---|
| 12 | phenyl | —H | —H | —N(CH₂—CH=CH₂)₂ | Orange | 414 |
| 13 | " | " | " | —NH—(3-OCH₃-phenyl) | " | " |
| 14 | " | " | " | —NH—cyclohexyl | " | " |
| 15 | " | " | " | —N(C₂H₄OCH₃)(C₂H₄CN) | " | " |
| 16 | " | —CH₃ | " | —N(H)(CH₂—C(CH₃)=CH—OH) | " | 415 |

TABLE 2-continued

General Formula

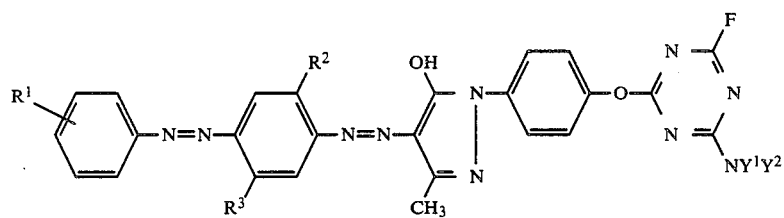

| No. | R¹ | —R² | —R³ | —NY¹Y² | Hue of Dyed Product | $\lambda_{max}$ (acetone) nm |
|---|---|---|---|---|---|---|
| 17 | Br—⌬— | —OC$_2$H$_5$ | " | —N(C$_2$H$_4$OCH$_3$)(C$_2$H$_4$CN) | " | 424 |
| 18 | O$_2$N—⌬— | —H | —OC$_2$H$_5$ | —N(CH$_3$)(C$_2$H$_4$N(CH$_3$)$_2$) | " | 429 |
| 19 | Cl—⌬— | —H | —H | —N(pyrrolyl) | " | 418 |
| 20 | ⌬— | —OCH$_3$ | —H | —N(C$_2$H$_4$OH)(CH$_2$Ph) | " | 417 |
| 21 | CH$_3$C(=O)NH—⌬— | —H | —C$_2$H$_5$ | —NHC$_8$H$_{17}$(sec) | " | 421 |

TABLE 3

General Formula

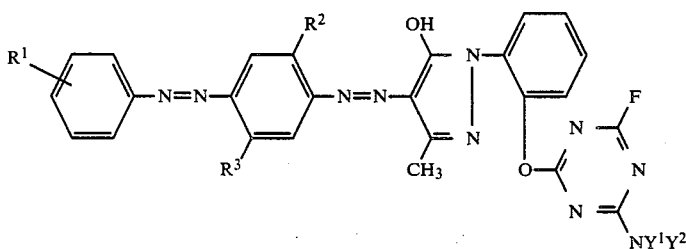

| No. | R¹ | —R² | —R³ | —NY¹Y² | Hue of Dyed Product | $\lambda_{max}$ (acetone) nm |
|---|---|---|---|---|---|---|
| 22 | ⌬— | —H | —H | —N[C$_6$H$_{13}$(n)]$_2$ | Orange | 414 |
| 23 | " | " | " | —N(CH$_3$)$_2$ | " | " |

TABLE 3-continued

General Formula

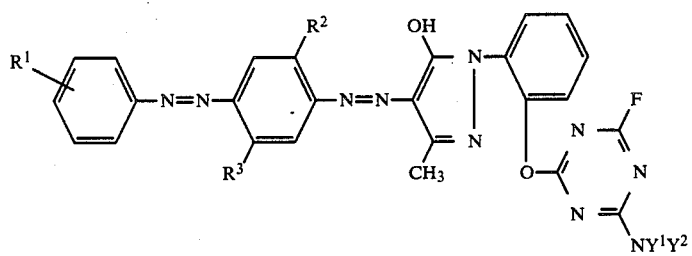

| No. | $R^1$ | $-R^2$ | $-R^3$ | $-NY^1Y^2$ | Hue of Dyed Product | $\lambda_{max}$ (acetone) nm |
|---|---|---|---|---|---|---|
| 24 | Cl—⟨phenyl⟩— | —CH₃ | —OC₂H₅ | —N[C₅H₁₁(i)]₂ | " | 425 |
| 25 | ⟨phenyl with C₂H₅⟩— | —H | —H | —N(C₂H₄OC₂H₄OCH₃)₂ | " | 415 |
| 26 | O₂N—⟨phenyl⟩— | —H | —H | —NH₂ | " | 428 |

COMPARATIVE EXAMPLE 1

Experiments of comparing a dye of the present invention with a conventional dye were conducted as follows:

Dyes Used

The structural formula of the dye of the present invention used herein and that of the conventional dye are shown in Table 4.

For reference, the conventional dye used is a dye described in Japanese Patent Application Laid-open No. 151064/1980.

Experiments (A) Light Fastness

Measuring Method:

Each of the dyes was used in the same manner as in Example 1, and light fastness of each of the dyed fabrics was measured.

The results are shown in Table 4.

(B) Cotton-Staining Fastness

This fastness relates to staining properties of the dyed fabric onto a white material. Excellent cotton-staining fastness means that the printed fabric does not stain a white material in contact therewith, and thus the printed fabric has high quality.

Measuring Method:

A printing color paste was prepared according to Example 1 using each of the above-described dyes, applied to a polyester/cotton mixed spun cloth (mixing ratio: 65/35) using a screen printing machine, dried at 80° C. for 3 minutes, then dry heated at 215° C. for 90 seconds to fix. A cotton cloth of the same area was applied to the printed cloth, immediately treated in a washing solution containing 2 g/liter of Na₂CO₃ and 2 g/liter of Scoural #900 (bath ratio=1:200) at 80° C. for 15 minutes, and the degree of stain on the cotton cloth was measured.

The results are shown in Table 4.

TABLE 4

| Dye | Structural Formula | Light Fastness (grade) | Cotton-Staining Fastness (grade) |
|---|---|---|---|
| Dye of the invention | | 5 | 5 |
| Conventional dye | | 4 | 3–4 |

We claim:

1. A disazo dyestuff for cellulose or cellulose-containing fibers of the formula:

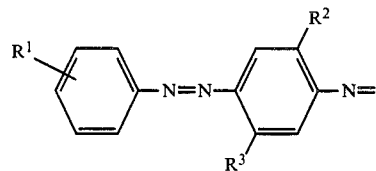

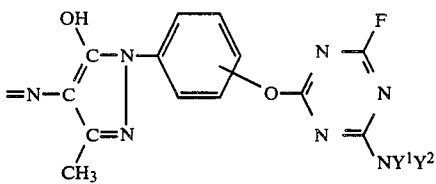

wherein $R^1$ represents hydrogen or halogen; $R^2$ and $R^3$ each represent hydrogen or methyl; $Y^1$ and $Y^2$ each represent alkyl or alkenyl, or $Y^1$ and $Y^2$ taken together with the nitrogen atom to which they are attached are a 5-membered or 6-membered nitrogen containing heterocyclic ring, and the total number of carbon atoms in groups $Y^1$ and $Y^2$ is no more than 18.

2. The disazo dyestuff of claim 1, wherein $R^3$ represents hydrogen.

3. The disazo dyestuff of claim 1, wherein $R^1$, $R^2$ and $R^3$ each represent hydrogen: $Y^1$ and $Y^2$ each represent alkyl, and the total number of carbon atoms in groups $Y^1$ and $Y^2$ is 6–12.

* * * * *